United States Patent [19]

Katerberg et al.

[11] Patent Number: 4,897,666

[45] Date of Patent: Jan. 30, 1990

[54] CONTINUOUS INK JET STIMULATION ADJUSTMENT USING IMPROVED OVERDRIVE DETECTION

[75] Inventors: James A. Katerberg, Kettering; Robert L. Wint, Trottwood; Richard A. Lewis, Miamisburg, all of Ohio

[73] Assignee: Eastman Kodak Company, Rochester, N.Y.

[21] Appl. No.: 265,100

[22] Filed: Oct. 31, 1988

[51] Int. Cl.[4] .......... G01D 18/00

[52] U.S. Cl. .......... 346/1.1; 346/75

[58] Field of Search .......... 346/1.1, 7.5

[56] References Cited

U.S. PATENT DOCUMENTS 4,631,549 12/1986 Braun et al. .......... 346/1.1

OTHER PUBLICATIONS

G. L. Ream, "Servo Control of Multinozzle Ink-Jet Operating Point", Mar./Apr. 1984/282-288, IEEE Transactions on Industry Appln's, vol. IA-20, No. 2.

*Primary Examiner*—H. Broome
*Assistant Examiner*—Gerald E. Preston
*Attorney, Agent, or Firm*—John D. Husser

[57] ABSTRACT

A method of adjusting stimulation amplitude in continuous ink jet printers to provide satellite-free printing includes the steps varying the stimulation amplitude between the underdrive and overdrive stimulation conditions, charging the resulting ink jet filaments at their break off points with sawtooth voltage of period equal to the stimulation period, detecting and storing the resultant drop charging events and setting the operating stimulation amplitude based on the inception point inflection in the resulting stimulation amplitude versus detected charge relation.

2 Claims, 4 Drawing Sheets

CONTINUOUS INK JET STIMULATION ADJUSTMENT USING IMPROVED OVERDRIVE DETECTION

FIELD OF INVENTION

The present invention relates to continuous ink jet printing methods and apparatus and more particularly to systems and procedures for controlling the stimulation amplitude of ink jet streams to improve such printing.

BACKGROUND OF INVENTION

In continuous ink jet printing, streams are discharged from an orifice or array of orifices to form droplet streams. To regulate the streams' breakup into uniformly sized and spaced drops, series of energy pulses of predetermined frequency are applied to the ink stream. One preferred mode for applying the pulse series that stimulate uniform droplet streams is by vibration, e.g., for the orifice plate, a resonator housing or the ink volume behind the orifices. When the issuing ink streams (called filaments) break up properly into droplet streams, the filament tip separates into a droplet within a predetermined drop charge region that is opposite a charge electrode. The charge electrode is energized with a charge voltage, or is not so energized, in accord with an information signal; and because the ink is conductive and grounded, a charge is correspondingly induced, or not induced, on the drop then formed at the drop charge region. Ink droplets thereafter pass to the print zone, or are caught, in accord with their charged or non-charged conditions.

It will be appreciated that one important factor for good printing operations is that the ink filaments break up into drops within a range of locations along the drop path that is acceptably close to the charge electrode. The nominal charging region is defined mainly by the length of the drop charge electrode in the direction of the ink jet stream. Drop breakup before or beyond the nominal charging region can result in improper drop charging.

To obtain reliable drop charging, it is also important that the stimulating energy applied to the ink filament have an amplitude that avoids formation of small satellite drops during drop break off. It is difficult to control drop charging and deflection in the presence of such satellite drops. It is well known, e.g., see U.S. Pat. No. 4,631,549, that as the amplitude of drop-stimulating energy increases, the drop break off conditions change from: (i) "underdrive" conditions where satellites are formed to (ii) a satellite-free condition where no satellites are formed to (iii) an "overdrive" condition where satellites are again formed. In addition to dependence on stimulation energy amplitudes, the domains where satellite and non-satellite drop formation occur depend on other systems parameters (e.g., ink temperature, ink viscosity and ink pressure). These parameters will vary gradually over periods of time and prior art techniques have been developed to periodically check and adjust the stimulation amplitude to assure optimum drop charging.

In one prior art procedure, the underdrive and overdrive drop formation conditions are visually identified, and an operating stimulation amplitude between the amplitudes corresponding to those conditions is selected. The visual adjustment technique requires high skill levels in detecting and measuring the critical conditions and it is very time consuming.

In a procedure taught by U.S. Pat. No. 4,631,549, an operating stimulation amplitude is adjusted by detecting the stimulation amplitude at the infinite satellite condition (with an electrometer) and selecting the operation amplitude to be a value that is a predetermined multiple of the detected infinite satellite stimulation amplitude. The infinite satellite detection and adjustment approach is sometimes hard to effect, e.g., when satellites are smaller than normal due to lower ink pressures. Also, the optimum operating point amplitude sometimes varies relative to the infinite satellite amplitude from a fixed predetermined multiple value, depending, e.g., on temperature, pressure, orifice size and ink properties.

Another approach for adjusting the stimulation amplitude is described in a publication "Servo Control of Multinozzle Ink-Jet Operating Point"by G. L. Ream; *IEEE Transactions on Industry Applications,* Vol. IA-20, No. 2, March/April 1984. In this approach, the stimulation amplitude is set to operate at the minimum filament length condition by detection of changes in relative phase between drop break off and a drop charge signal. For each of a series of stimulation amplitude increases a 20% duty cycle pulse train is incremented through 16 phase settings, and drop charge is measured to determine a mean break off phase. When the mean break off phase reverses sign, the minimum filament length has been reached. This procedure is time consuming and electronically complicated.

SUMMARY OF INVENTION

One significant purpose of the present invention is to provide improved apparatus and methods for adjusting the stimulation amplitude of continuous ink jet printer systems to achieve more optimum drop charging and deflection. The present invention provides the advantages of being machine implemented, thus not requiring operator skills and effort. The present invention also has the advantages of providing a reliably detectable base point condition for adjustment and having a stable adjustment relationship between its detected base point condition and the preferred nominal operating point. In addition, the present invention has the advantage of relatively simple structural and electronic design.

In one preferred aspect the present invention constitutes a method for adjusting the stimulation amplitude of a continuous ink jet printer so that drop break off occurs reliably within the satellite-free region of stimulation. The method includes the steps of: (a) applying to a drop charge electrode, which extends adjacent the ink filament length from an underdrive filament length position to the filament length position of overdrive inception, a test signal comprising a periodic sawtooth voltage of frequency approximately equal to the operating stimulation frequency; (b) directing an ink jet stream past the drop charge electrode to a charge detector; (c) stimulating the ink jet stream with a stimulating energy signal of the operating stimulation frequency and gradually increasing the amplitude of the signal from underdrive to overdrive magnitude; (d) detecting and storing the electrical signals from the charge detector during the amplitude increase; and (e) setting the operation stimulation amplitude based on the overdrive inception point inflection in the stimulation amplitude versus detector charge current relation.

In other aspects the present invention constitutes preferred methods and structures for employing such stimulation adjustment.

BRIEF DESCRIPTION OF THE DRAWINGS

The subsequent description of preferred embodiments of the invention refers to the accompanying drawings wherein.

DETAILED DESCRIPTION OF THE PREFERRED EMBODIMENTS

Figure 1:
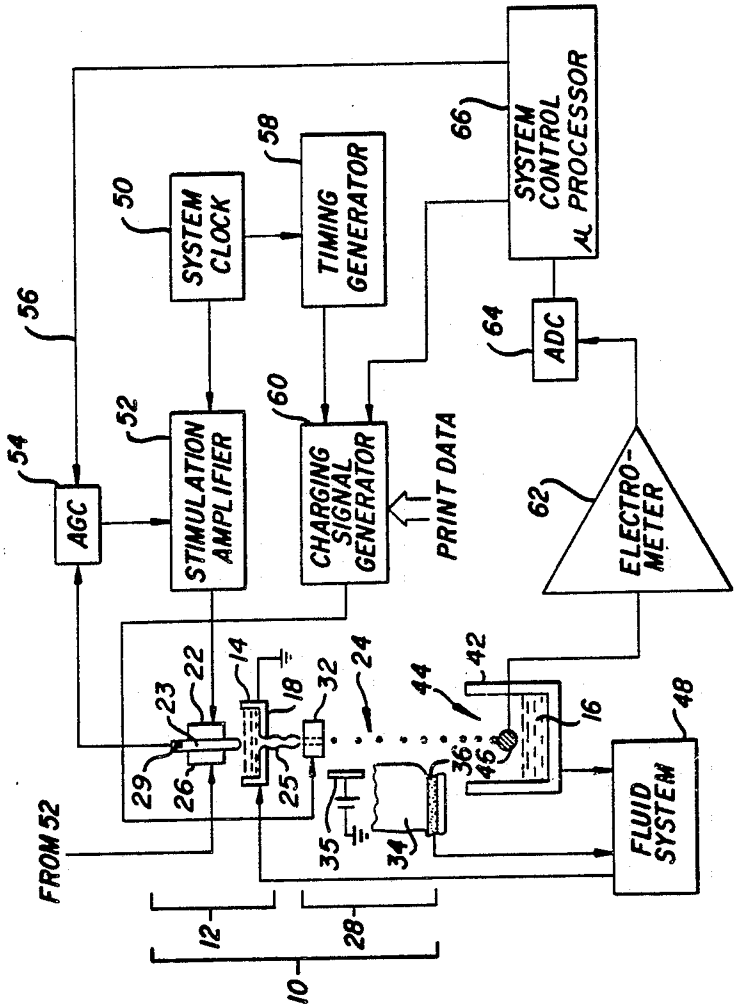
FIG. 1 is a schematic diagram showing one preferred print head and stimulation adjustment system in accord with the present invention.

Referring to FIG. 1, a continuous binary ink jet printing head is shown schematically, with portions in cross section, along with associated electronics for practicing a preferred mode of the present invention. The upper print head 12 can be of the type shown in U.S. Pat. No. 4,583,001 and includes means defining an ink reservoir 14 containing conductive ink under pressure. The pressurized ink is forced through an orifice plate 18 to produce an ink filament(s) 20.

Piezoelectric transducers 22, 26 are mechanically coupled to a resonant body 23 mounted on the upper head portion 12 for inducing mechanical vibrations in the orifice plate 18, and thereby in the ink, to stimulate controlled breakup of the ink filament into drops 24. A piezoelectric feedback transducer 29 also coupled to the resonant body measures the amplitude of stimulation imparted to the orifice plate 18 by the transducers 22, 26.

The ink jet printing head 10 also includes a lower portion 28 having a drop charging electrode 32 arranged around or adjacent the ink jet filament 20 for inducing information charge on the ink drops 24 as they separate from the ink filament 20. Charged drops are deflected, e.g. by a biased deflection electrode 35, into the face of a drop catcher 34 where they are collected into an ink gutter 36 comprising a slot at the bottom of the drop catcher 34. In accord with the present invention, the upper and lower print head portions can comprise other resonator, charge electrode and catcher configurations, e.g. see U.S. Pat. No. 4,334,232. In some embodiments a separate deflection electrode is not needed, see U.S. Pat. No. 4,636,808.

A home station 42 is provided at a suitable location and defines an ink sump 44 for receiving ink drops the ink jet print head that are not sufficiently charged to be deflected onto the drop catcher 34. An electrometer electrode 46 is located in the home station 42 in a position to receive the electrical charge carried by the ink drops entering the home station. Exemplary preferred constructions for the electrometer system of such home station are disclosed in U.S. Pat. No. 4,591,874. A fluid system 48, hydraulically connected to the print head 10, and home station 42, supplies the condutive ink, under pressure, to the upper head portion 12 of the printing head, and recirculates the ink from the ink gutter 36 and from the sump 44 of the home station 42.

The ink jet printer electronics includes a system clock 50 that supplies a periodic clock signal corresponding to the desired drop frequency (e.g., 75 KHz) to a stimulation signal amplifier 52. The output of the stimulation amplifier 52 is applied to the piezoelectric transducers 22, 26 on the resonator portion 23 of the upper print head 12. The gain of the stimulation amplifier, and hence the amplitude of the stimulation signal is controlled by an automatic gain control servo 54. The automatic gain control servo 54 receives a reference level signal on line 56, and a feedback signal from feedback transducer 29, and controls the gain of the stimulation amplifier such that the feedback signal matches the reference signal.

The clock signal from the system clock 50 is also connected to a timing generator 58 that produces timing pulses that determine the phase of the printing pulses that are applied to charging electrode 32. The timing pulses are applied to a charging signal generator 60 that can receive a digital print data signal during printing and then generates the printing pulses that are applied to the charging electrode 32.

An electrometer 62 is connected to the electrometer electrode 46, and generates an analog signal that is proportional to the ink jet current incident on the electrometer electrode 46. The analog output signal of the electrometer is supplied to an analog to digital converter 64 to produce a digital signal indicative of the ink jet current sensed by the electrometer 62.

A system control microprocessor 66 receives the digital ink jet current signal from the electrometer 62 and is programmed as described below, to store the detected data representative of outputs from electrometer 62, to compute a preferred operating stimulation amplitude based thereon, and to control the gain of the stimulation amplifier 52 by providing a reference signal to automatic gain control circuit 54 on line 56.

Before describing the general operational principles of the present invention, a brief review of the various filament stimulation conditions will be helpful. Thus, the nominal filament length of an unstimulated ink jet is relatively long, and the drop separation is not well behaved. As the stimulation amplitude is increased, the filament gets shorter. Eventually, slow satellite drops (small droplets occurring between the main ink drops which travel slower than the main drops and hence are quickly overtaken and assumed into the main drops) are formed. As the stimulation amplitude is further increased, the speed of the satellites increases until a region is reached wherein the speed of the satellite droplets equals the speed of the main ink drops, and the satellite droplets remain separate from the main drops. This is called the infinite satellite region. A further increase in stimulation amplitude produces fast satellites (droplets that travel faster than the main drops, and hence overtake and are assumed by the main drops). It should be noted that the boundaries of these regions are not clearly defined and that the general locations of the regions of satellite production are a function of ink temperature, pressure, viscosity and surface tension. Collectively, these regions are referred to herein as the underdrive regions.

As the stimulation amplitude is further increased, a region of satellite-free drop production is encountered.

This region is the desirable range of operation of the ink jet print head. At some still higher stimulation amplitude, herein referred to as the overdrive inception point, the ink jet filament reaches a minimum, and then begins to lengthen again. In this overdrive region of again-increasing filament length condition, satellites may also be produced, but their production is extremely unpredictable.

Stimulation and detection charging in accord with one preferred embodiment of the present invention will be described further by referring now to FIGS. 2A–2D. In those Figures the length of filament 20 can be seen to progressively shorten as the stimulation amplitude is increased and then again length (FIG. 2D) as amplitude is further increased past the overdrive inception point. Thus FIG. 2A corresponds to an underdrive amplitude condition wherein drop separation is not well behaved. As the amplitude is increased, the filament shortens through the slow satellite, infinite satellite conditions and fast satellite conditions of drop break off. Further increase in amplitude further shortens the filament and it passes through the desired, satellite-free condition (shown in FIG. 2B) to the minimum filament length (i.e. overdrive inception point stimulation amplitude condition) represented schematically in FIG. 2C. Further increase in amplitude causes the filament to commence lengthening as shown in FIG. 2D and satellites again occur.

Figure 2A:
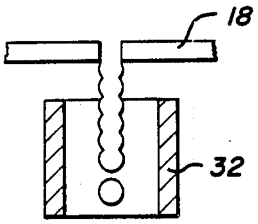
FIGS. 2A–2D are enlarged schematic views of the FIG. 1 print head system illustrating different stimulation conditions.
Figure 2B:
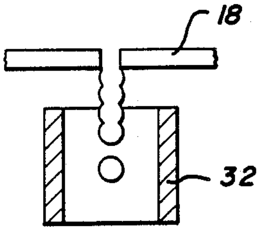
Figure 2C:
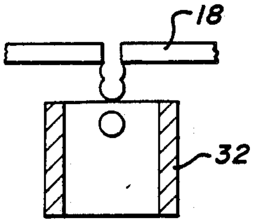
Figure 2D:
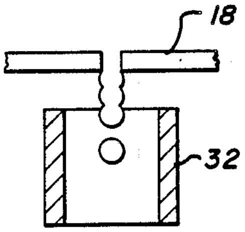
Figure 3A:
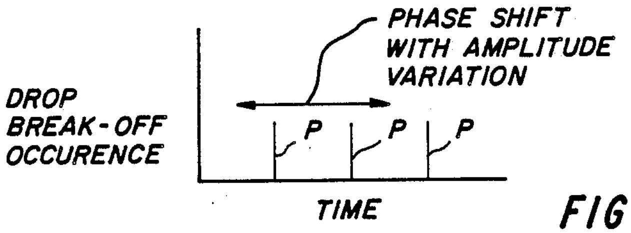
FIGS. 3A–3C are drop frequency and signal voltage diagrams useful for explaining the present invention.

Referring now to FIG. 3A, a diagram is provided illustrating the drop break off occurrence versus time (i.e. frequency) of an ink jet droplet stream when stimulated by a fixed amplitude stimulation signal. As indicated by the arrow in FIG. 3A, the phase of the drop occurrence will shift along the time axis with variation in stimulation amplitude. That is, the frequency of drop occurrences (indicated by the vertical lines along the time axis) will remain constant, approximately equal to the frequency from system clock 50. However, the phase of the drop break off occurrences will shift as the distance from orifice plate to break off point varies between the conditions shown in FIGS. 2A–2D.

Figure 3B:
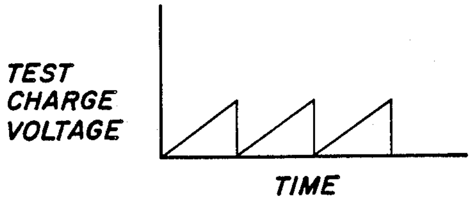
Figure 3C:
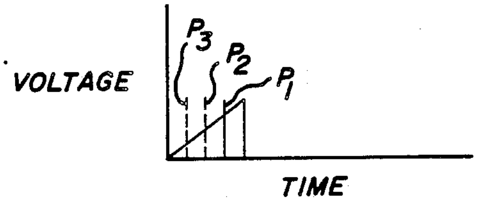

The present invention utilizes a fixed phase sawtooth voltage signal such as illustrated in FIG. 3B, applied to the charge plate 32, to detect the change in phase of drop occurrence and thus the filament length. More particularly, the period of the increasing amplitude ramp voltage signal illustrated in FIG. 3B is the same as the drop occurrence frequency and the charge obtained by a droplet at break off will depend upon the amplitude of voltage present on electrode 32 at that instant. Thus as shown in FIG. 3C, the charge on a drop occurring at solid line phase condition $P_1$ will be greater tha that of drops occurring at phase conditions $P_2$ or $P_3$ (dotted lines in FIG. 3C).

Figure 4:
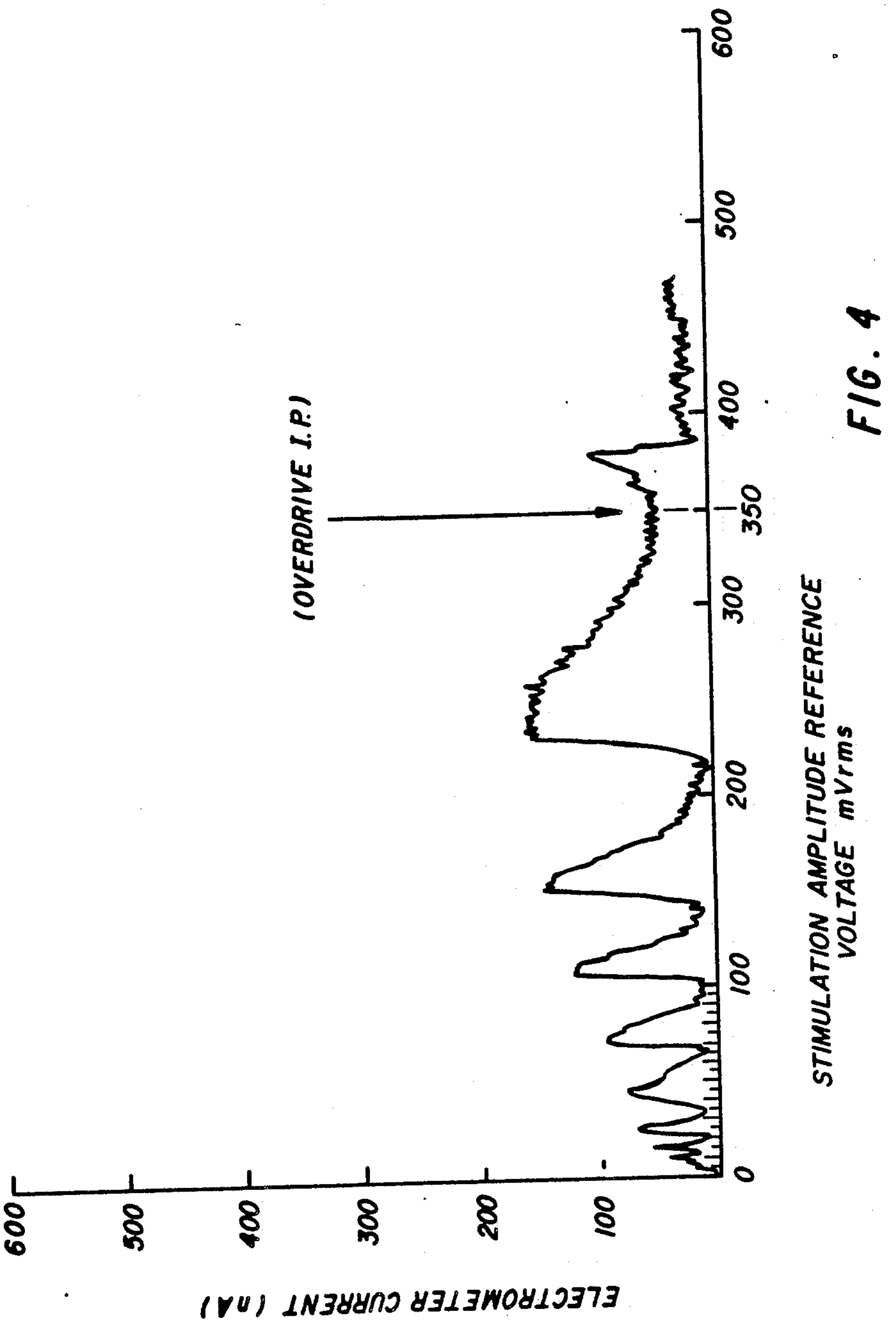
FIG. 4 is a graph showing detected drop charge current versus stimulation feedback voltage for use in accord with one preferred mode of the present invention.

FIG. 4 illustrates a plot of drop charge current from electrometer 62 versus stimulation feedback voltage from tab 29 for a test procedure effected with the FIG. 1 system applying the FIG. 3B sawtooth voltage signal to charge electrode 32. That is, the ordinate value of the curve represents the relative magnitude of drop charge transmitted to drops at break off by the ramp charge signal, as the stimulation amplitude is increased (along the abscissa).

In the FIG. 4 plot, it can be seen that at lower stimulation amplitudes (in the 0–15 mV feedback tab voltage range) the drop electrometer signal comprises a series of increasing magnitude peaks. These correspond to the drop charge transmitted when break off was in phase with the maximum value of the voltage sawtooth signal. The peak values increase with increasing stimulation amplitude because of increasing charging effectiveness (due to decreasing satellites and better filament tip alignment with the charge electrode). The peak values have intervening ramp decreases because the drop occurrence frequency shifts toward lower magnitude regions of the periodic ramp voltage signal as stimulation amplitude increases (and filament length shortens). That is, an increase of the stimulation amplitude causes a drop break off phase point P to gradually shift left on the FIG. 3C curve. After the phase point shifts to an extent that it coincides with a zero voltage on the sawtooth signal it next shifts to the high voltage of the sawtooth creating the next voltage peak on the FIG. 4 plot.

However, at some point in a plot, such as FIG. 4, the filament length will begin to increase instead of shorten in response to increasing stimulation amplitude. In the FIG. 4 test, this occurs during the increase of stimulation reference voltages within the 230 mV to 380 mV range. Thus, at about 350 mV feedback voltage, the drop charge begins to increase rather than decrease. This corresponds to the phase of drop break off beginning to shift to higher values vis-a-vis the charge ramp voltage, i.e. to a phase point P shifting right rather than left on the FIG. 3C diagram. Stated another way, at the overdrive inception point I.P. (about 350 mV), the filament length begins to increase as shown in FIG. 2D and the phase of drop break off relative to the charge signal phase reverses its previous direction of shift. The current detected by electrometer 62 therefore begins to increase.

Summarizing then, with a sawtooth charge voltage of period equal to the drop frequency, the drop charge is determined by the phase between the drop break off and the sawtooth function. As stimulation is increased, the break off time decreases, yielding a decrease in drop charge until the overdrive inception point is reached. Above that point, the break off time, and thus jet current, increase with increasing stimulation amplitude.

When the stimulation amplitude is increased as indicated along the abscissa of FIG. 4, the break off phase is decreased through several 360° cycles before reaching the overdrive inception point. For each cycle, the drop charge curve segment has a minimum corresponding to the drop breaking off at the 0 volt minimum of the charge voltage. The curve segments having these minimums are not used for stimulation amplitude detection and can be distinguished from segment containing the overdrive inception point data in the following ways:

1. The curve inflection points which correspond to 0 volt charging voltage have current values approaching 0 current and the overdrive inception point curve inflection point does not.

2. The overdrive inception point curve inflection is gradual; the others are narrow with a steep rise on the high amplitude side.

3. The stimulation amplitudes of the 0 volt curve inflection shift, if the sawtooth charge voltage phase is shifted relative to the stimulation drive signal, while the overdrive inception point curve inflection point does not.

We have found that by detecting the overdrive inception point as described above, a reliable operational stimulation amplitude can be computed. This operational stimulation amplitude assures operation well within a satellite-free drop formation range.

Figure 5:
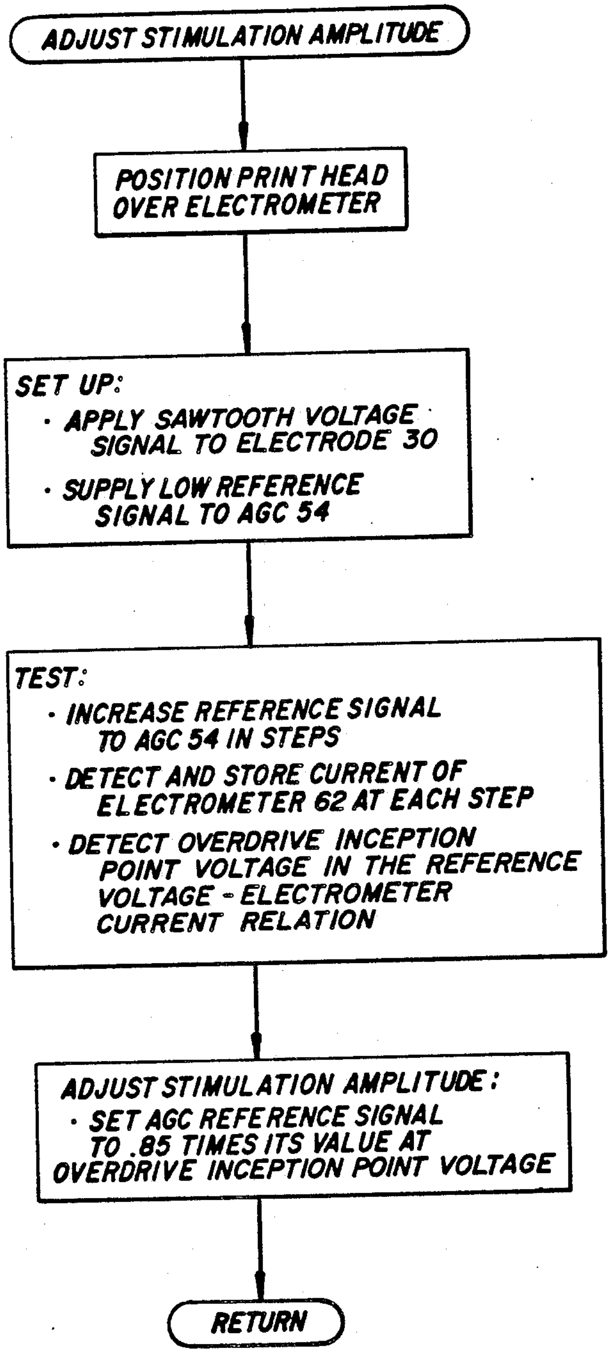
FIG. 5 is a flow chart illustrating one preferred routine for stimulation amplitude adjustment in accord with the present invention.

FIG. 5 illustrates, in block diagram, one preferred control procedure efected by microprocessor 66 to test and set the stimulation signal amplitude in accord with the present invention. Thus, the print head 10 is traversed to a location over the home station 42. A sawtooth ramp signal such as described is continuously applied to electrode 32 and a low reference signal is applied to automatic gain control 54. This causes low amplitude stimulation, corresponding to the FIG. 2A filament length. The microprocessor 66 thereafter controls successive incremental increases in the reference signal 54 and stores the data corresponding to voltage levels detected from electrometer 62 as they relate to particular reference signals. The microprocessor (via a ROM program) then detects the point of minimum charge level in the curve segment containing the overdrive inception point. The microprocessor then sets the AGC reference signal to a value which is a predetermined fraction of its value at the overdrive inception point. We have found that an operating point set at 0.85 of the so determined overdrive inception point stimulation amplitude provides highly reliable charge and deflection.

The invention has been described in detail with particular reference to preferred embodiments thereof, but it will be understood that variations and modifications can be effected within the spirit and scope of the invention.

I claim:

1. A method for adjusting the stimulation amplitude of a continuous ink jet printer so that drop break off occurs reliably within the satellite-free region of stimulation, said method comprising:

(a) applying to a drop charge electrode, which extends adjacent the ink filament length from an underdrive filament length position of the filament length position of overdrive inception, a test signal comprising a periodic sawtooth voltage of frequency approximately equal to the operating stimulation frequency;

(b) directing an ink jet stream past said drop charge electrode to a charge detector;

(c) stimulating said ink jet stream with a stimulating energy signal of the operating stimulation frequency and gradually increasing the amplitude of said signal from underdrive to overdrive magnitude;

(d) detecting and storing the electrical signals from said charge detector during said amplitude increase; and (e) setting the operating stimulation amplitude based on the overdrive inception point inflection in the stimulation amplitude versus detector charge current relation.

2. In a continuous ink jet printer of the kind having means for forming a plurality of ink streams, means for applying a stimulating energy signal of predetermined frequency to said ink streams and means located along drop break off points of said ink stream paths for charging stimulated in drops, an improved stimulation adjustment system comprising:

(a) electrometer means, located to receive such ink drop streams, for generating a current signal indicative of said drop stream charge;

(b) means for applying a sawtooth test charge voltage of frequency approximately equal to said stimulation frequency to said charge electrode;

(c) means for varying the amplitude of the stimulation signal between underdrive and overdrive filament conditions;

(d) means for storing the current signals from said electrometer means in identified relation to the variation of stimulation signal amplitude; and (e) means for setting the operating stimulation voltage based on the overdrive inception point inflection in the stored stimulation amplitude versus detector charge current relation.

* * * * *